(12) United States Patent
Fourcault et al.

(10) Patent No.: US 8,974,555 B2
(45) Date of Patent: Mar. 10, 2015

(54) METHOD AND APPARATUS FOR TREATING A SYNGAS

(75) Inventors: Alice Fourcault, Bordeaux (FR); Jean-Paul Robert-Arnouil, Merignac (FR); Erika Edme, Bordeaux (FR)

(73) Assignee: Europlasma, Morcenx (FR)

( * ) Notice: Subject to any disclaimer, the term of this patent is extended or adjusted under 35 U.S.C. 154(b) by 601 days.

(21) Appl. No.: 13/369,018

(22) Filed: Feb. 8, 2012

(65) Prior Publication Data

US 2012/0193215 A1    Aug. 2, 2012

Related U.S. Application Data

(63) Continuation-in-part of application No. 11/870,040, filed on Oct. 11, 2007, now abandoned.

(51) Int. Cl.
| | |
|---|---|
| *B01J 7/00* | (2006.01) |
| *C01B 3/50* | (2006.01) |
| *C10J 3/00* | (2006.01) |
| *C10J 3/84* | (2006.01) |
| *C10K 1/00* | (2006.01) |
| *C10K 3/00* | (2006.01) |

(52) U.S. Cl.
CPC ... *C01B 3/50* (2013.01); *C10J 3/00* (2013.01); *C10J 3/84* (2013.01); *C10K 1/00* (2013.01); *C10K 3/00* (2013.01); *C01B 2203/0465* (2013.01); *C01B 2203/0475* (2013.01); *C01B 2203/048* (2013.01); *C01B 2203/0485* (2013.01); *C01B 2203/0495* (2013.01); *C10J 2300/0916* (2013.01); *C10J 2300/0946* (2013.01); *C10J 2300/1238* (2013.01); *C10J 2300/165* (2013.01); *C10J 2300/1671* (2013.01); *C10J 2300/1838* (2013.01); *C10J 2300/1884* (2013.01)

USPC .......................................................... 48/61

(58) Field of Classification Search
CPC ................ C10J 2300/1238; C01B 2203/0861; F23G 2204/201; F23G 5/085; B01J 2219/0894; B01J 2219/0898
See application file for complete search history.

(56) References Cited

U.S. PATENT DOCUMENTS

| | | | | |
|---|---|---|---|---|
| 4,181,504 | A * | 1/1980 | Camacho | 48/197 R |
| 5,960,026 | A * | 9/1999 | Nolting et al. | 373/24 |
| 2002/0151604 | A1* | 10/2002 | Detering et al. | 518/703 |
| 2003/0024806 | A1* | 2/2003 | Foret | 204/164 |
| 2007/0196249 | A1* | 8/2007 | Fridman et al. | 422/186.04 |
| 2007/0266633 | A1* | 11/2007 | Tsangaris et al. | 48/197 R |
| 2008/0033066 | A1* | 2/2008 | Haynes | 518/702 |
| 2008/0245749 | A1* | 10/2008 | Matveev | 210/787 |

* cited by examiner

*Primary Examiner* — Imran Akram
(74) *Attorney, Agent, or Firm* — Perman & Green, LLP (57) ABSTRACT

Treating a synthesis gas includes generating a plasma jet from a non-transferred arc torch having a main axis, the jet having a propagation axis substantially collinear with the torch main axis. The plasma torch is mounted on a feed enclosure. The syngas is received at an inlet port of the feed enclosure, downstream from the plasma torch and feeding the syngas so the flow encounters the plasma jet to mix the syngas and plasma jet in a distribution chamber. The mixture is propagated in a reactor downstream from the feed enclosure to convert the syngas into an outlet gas. The reactor is in communication in its upstream portion with the feed enclosure through a flared segment, and has a longitudinal axis that is substantially collinear with the propagation axis of the plasma jet. The outlet gas is extracted via an outlet port and particles are captured by a submerged conveyor.

15 Claims, 4 Drawing Sheets

METHOD AND APPARATUS FOR TREATING A SYNGAS

CROSS-REFERENCE TO RELATED APPLICATION

This application is a continuation-in-part (CIP) of co-pending U.S. patent application Ser. No. 11/870,040, filed on 11 Oct. 2007, which is incorporated by reference herein in its entirety.

BACKGROUND

The disclosed embodiments relate to a method and to apparatus for treating a synthesis gas or "syngas". It also relates to a system for treating waste or biomass, which system is equipped with such treatment apparatus.

Methods are known that make it possible to obtain a syngas

Autothermal gasification is, for example, a well-known method whose main mechanism seeks, in oxygen under-stoichiometry and by injecting steam, to decompose carbon chains such as those contained in biomass, forest residues, household and hospital waste, soiled wood, and any other waste having organic potential, with a view to obtain a syngas that is combustible and suitable for use in recycling.

The definite advantage procured by gasification is that, in the absence of full combustion, the organic fraction decomposes in the form of a combustible gas (fuel gas) whose "lower combustion value" (LHV) or "net calorific value" (NCV) increases with decreasing presence of carbon dioxide, of water vapor and of nitrogen, these molecules being inefficient when used in recycling as means to generate electricity, as biofuel, or in organic chemistry.

In addition, the presence of tars and of particles containing solid carbon (Char) in the syngas constitutes a major drawback for the elements downstream from the gasification reactor. Such particles (tars and char) can condense easily in the syngas treatment pipes, thereby giving rise to obstruction of said pipes and to risks of fire starting spontaneously on opening the pipes for maintenance purpose. Furthermore, such solid elements can build up on gas turbine blades and in gas engines, thereby lastingly reducing performance thereof and increasing frequency of servicing and maintenance thereof.

The vast majority of technologies for preparing syngas prior to use in recycling consist in removing the solid particles (tars and char) as soon as the syngas leaves the autothermal gasification reactor, such removal being by filtration (cyclonic filter, bag filter, electrostatic filter), condensation (water scrubber, oil scrubber), or cracking the solid particles by using catalytic reactions (using pure oxygen and steam) or indeed by high-temperature reforming (using pure oxygen).

The constraints imposed by the design of autothermal gasification reactors, the refractory materials of which they are made, and the presence of moving elements (rakes made of refractory steel, sands, metal balls) making it possible to homogenize the load, mean that it is difficult for temperature higher than 1000° C. to be withstood.

Treatment capacity is also limited by the variability of the incoming matter in terms of composition and grain-size, and by its humidity level and its mineral content, and in particular its heavy metal content.

Those factors result in gasification methods being performed at temperatures lying in the range 600° C. to 1000° C. in order to be economically viable.

Therefore, it is necessary to accept obtaining a syngas with a mediocre NCV because although it admittedly contains carbon monoxide and Hydrogen as dominant species, it also contains by-products that cannot be used in recycling, such as carbon dioxide, water vapor, and nitrogen.

As regards the solid particles (char) in suspension in the syngas, the approach consists in extracting them from the syngas and in recycling them back into the reactor as a thermal energy source. That action, which consists in removing that carbon potential initially available in the organic material to be treated from the gasification method, gives rise to a limitation of the carbon efficiency, the direct consequence of which is a limitation in the NCV.

The risks are also environmental and health ones for the operators. Extracting solid particles in suspension in the syngas generate residual sludge in the syngas treatment system. That sludge then needs to be removed from the site to landfills or industrial waste incinerators. The operators are thus exposed to carcinogenic products during maintenance of the scrubbers or of the sewage treatment plants.

The flows of multi-phase waste, such as the mixture with the ashes at the bottom of the gasification reactor, and the residual sludge (tars/char/water/oil) coming from the treatment line for treating the syngas prior to use in recycling represent a considerable economic cost as regards removing them from the site to landfill or destruction sites.

Another gasification method is known, namely direct gasification using plasma. That method consists in attacking the organic material directly with plasma so as to convert it into a high-purity, high-temperature syngas.

The general configuration of such a method is usually as follows: one or more plasma deliver one or more plasma flows into a furnace fed with materials to be gasified and/or to be vitrified. The furnace then hosts thermochemical reactions for transforming the materials fed in, under the direct action and/or the indirect action of the plasma flow. The liquid and gas phases that result from the synthesis or from the plasma treatment are then recovered for any subsequent treatment implementing exiting techniques.

The essential components of such installations, except for the plasma tools implemented in the method, comprise apparatus for injecting solid matter in powder-form, or for injecting liquid, or indeed for injecting semi-liquid substances (sewage plant sludge, petroleum sludge).

Directly attacking incoming matter having a high organic content is not economically viable insofar as extracting humidity fraction contained in the organic material gives rise to electricity consumption which is less pertinent than using thermal energy recycled from the method.

Furthermore, the use of a single furnace lined with refractory material and that must cope with the liquid, solid, and gas phases gives rise to operating modes that limits the flow rate of incoming matter or the variability of the incoming matter.

It is the portion of the furnace that has to cope with the liquid mineral that withstands refractory lining corrosion/impregnation for the shortest amount of time. That portion is thus the floor of the furnace, which requires the gasification method to be stopped in order to perform maintenance on said floor.

The mixture of the plasma and of the materials to be gasified and/or to be vitrified does not include all of the materials, the thermochemical treatment mainly concerning an indirect process (thermal radiation coming from the refractory walls of the furnace that are heated to high temperatures under the action of plasma). Therefore the energy transfer between the plasma and the materials is not optimized.

Moreover, manufacturing the furnace requires the use of refractory materials whose erosion is very sensitive to the variations in temperature generated by varying energy needs corresponding to the variable chemical composition of the incoming materials, and by the periodic removal of the plasma tool for the purpose of changing electrodes. In addition, the chemical natures of the gases resulting from the plasma treatment can also limit the life of the refractory linings, in particular when said gases contain chlorine.

SUMMARY

An object of the disclosed embodiments is thus to propose an indirect gasification stage for indirectly gasifying organic materials using plasma with a view to transforming a gas of medium temperature, seeded with solid particles such as particles of tar and/or of char (solid carbon), coming from an autothermal pyrolysis or gasification reactor in order to obtain a syngas having high purity, and having reinforced carbon potential, and whose main components are carbon monoxide and hydrogen (dihydrogen).

To this end, the disclosed embodiments provide a method of treating a synthesis gas or "syngas".

According to the disclosed embodiments, this method comprises the following steps:
   generating a plasma jet from a non-transferred-arc torch having a main axis, said plasma jet having a propagation axis that is collinear, or substantially collinear, with the main axis of said non-transferred-arc plasma torch, said non-transferred-arc plasma torch being mounted on a feed enclosure;
   feeding said syngas in said feed enclosure downstream from said non-transferred-arc plasma torch so as to form a vortex flow that progresses towards said plasma jet in order to establish a contact zone between said plasma jet and at least part of said syngas, said contact zone enhancing thermal transfer between said plasma jet and said at least part of the syngas;
   the assembly formed by said plasma jet and said at least part of the syngas, propagating towards a flared segment that flares in the same direction as said propagation axis extends, said flared segment being configured to blow up said assembly and thus generate a turbulent mixture further increasing the heat transfer between said at least part of syngas and plasma jet;
   the turbulence of said turbulent mixture thus obtained being further increased by injection of at least one fluid via at least one injector placed on said flared segment;
   propagating said turbulent mixture in an elongate reactor placed downstream from said flared segment for the purpose of converting said syngas into an outlet gas, said reactor being in fluid communication in its upstream portion with said feed enclosure through said flared segment, and said elongate reactor having a longitudinal axis that is collinear or substantially collinear with the propagation axis of said plasma jet;
   extracting the outlet gas via an outlet port.

The expression "propagation axis that is substantially collinear with the main axis of the torch" is used to mean that the propagation axis of the plasma jet is either collinear with or coincides with the axis of the torch, or else that the volume of space occupied on average over time by the plasma jet has its axis coinciding with the main axis of the plasma torch. Under the effect of the forces exerted by the flow of syngas fed into the feed enclosure, the end of the plasma jet can be placed on either side of the main axis of the torch. However, the plasma jet occupies on average over time a position that coincides with the main axis of the torch.

The expression "longitudinal axis of the reactor that is substantially collinear with the propagation axis" is used to mean that the longitudinal axis is either collinear with or coincides with the propagation axis, or else that said longitudinal axis is substantially aligned on said propagation axis.

The expression "placed downstream from" is used to mean placed beyond, in the propagation direction of the plasma jet.

Whereas it is possible to separate the solid, liquid, and gas flows in prior art gasification apparatus, enabling the organic materials contained in the biomass or in the waste to be managed simply and basically, under controlled economic and operational conditions, the method of treatment of the disclosed embodiments offers the advantage of being highly flexible and of adapting to accommodate all of the situations encountered in implementing a gasification method, with a single aim: to reinforce the working potential of the carbon contained in the syngas to be treated, and to make the composition of said syngas tend towards two majority elements only, namely carbon monoxide (CO) and hydrogen (H2).

It is not therefore necessary to know the initial composition of the syngas to be treated.

It is possible to apply an instantaneous adjustment in the quality of the outlet gas by adjusting the power delivered by the plasma jet coming from the plasma torch. Adjusting the operational parameters of the torch is technically feasible within a time shorter than one second.

In addition, bringing the syngas up to temperature thanks to the power of the plasma torch does not give rise to any reduction in carbon monoxide through oxidation with air. Even if the plasma jet were formed with air as the plasma-generating gas, the plasma jet is not a flame and does not require any supply of combustion air in order to generate heat. The air quantity supply is lower than 5% of the air quantity request for a complete combustion of the syngas. The plasma jet, with its 5000° K. on average is a flow of ionized gaseous matter, in extinction, electrically neutral, and seeded with species such as electrons, ions, atoms, and radicals having high chemical reactivity. The radicals preferably go to re-associate with the species released by cracking of the non-advantageous molecules of the syngas to be treated brought up to temperature. Thus, the triatomic molecules ($CO_2$, $H_2O$) and the molecules having even more atoms ($CH_4$, $C_nH_m$) that have low atomic bonding potential break apart and tend to produce carbon monoxide (CO) and additional hydrogen (H2).

In various particular implementations of this method of treating a syngas, each having its own advantages and being susceptible of numerous technically feasible combinations:
   said syngas is fed in a direction that is distinct from said propagation axis so as to establish an intimate contact zone between the plasma jet and said at least part of the syngas,
   at least the gas velocity of said syngas is homogenized before being fed via at least two openings in said feed enclosure, in order to have the same flow rate throw each opening.

Advantageously, said syngas being received at least one inlet port, said syngas propagates then through a distribution chamber having an annular shape, surrounding said feed enclosure and being in communication with said feed enclosure via at least two openings:
   said syngas is fed in said feed enclosure via a plurality of openings circumferentially distributed around said plasma jet in order to have a vortex flow homogeneously distributed around said plasma jet,
   said syngas to be treated is fed in said feed enclosure so as to form a vortex flow that progresses towards said plasma jet along an helical path in order to increase its residence time in said elongate reactor, the composition of the syngas to be treated is adjusted by means of said at least one fluid injected via said at least one injector placed on said flared segment.

Advantageously, this fluid may be chosen from the group comprising water, carbon dioxide, oxygen, air and a combination of these elements.

the temperature of said outlet gas is measured and the power of said non-transferred-arc plasma torch is adjusted so as to control the conversion of said syngas into said outlet gas, said outlet gas being extracted via a first outlet placed radially to the reactor longitudinal axis, one extracts at least part of the inorganic part of the syngas thus treated via a second outlet whose main axis is collinear or substantially collinear with the longitudinal axis of said reactor.

Said second outlet comprises advantageously a water tap.

The disclosed embodiments also provide apparatus for implementing the method as described above. According to the disclosed embodiments, said apparatus comprises:

- a feed enclosure to which a flared segment is connected, said feed enclosure and said flare segment being in communication of fluid;
- said flared segment being further connected to an elongate reactor, said feed enclosure, said flared segment and said elongate reactor each having an internal volume defined by walls covered at least partially with refractory elements, said feed enclosure and said elongate reactor being in fluid communication through said flared segment;
- said feed enclosure including a non-transferred-arc plasma torch having a main axis, said non-transferred-arc plasma torch serving to generate a plasma jet having a propagation axis that is collinear or substantially collinear with the main axis of said non-transferred-arc plasma torch;
- said feed enclosure being provided with at least two openings placed downstream from said non-transferred-arc plasma torch, said at least two openings being configured to feed in a syngas in a manner such that said syngas forms a vortex flow that progresses towards said plasma jet so as to establish a contact zone between said plasma jet and at least part of said syngas;
- said at least two openings of said feed enclosure being in fluid communication with a distribution chamber surrounding at least partially said feed enclosure, said distribution chamber being provided with at least one inlet port receiving the syngas to be treated;
- said flared segment flaring in the same direction as said propagation axis extends to create a turbulent mixture from the assembly formed by said plasma jet and said at least part of the syngas, by blowing it up;
- said flared segment having at least one injector serving to feed in at least one fluid to enhance the turbulence of said turbulent mixture;
- said elongate reactor having a substantially cylindrical elongate shape, the longitudinal axis of said elongate reactor being collinear or substantially collinear with the propagation axis of said plasma jet, and
- said elongate reactor having at least an outlet port for extracting said outlet gas.

This system can be said to have an "in-line" configuration, i.e. the plasma torch, then the injection apparatus, then the flared segment, then the reactor, as opposed to the conventional configuration in which the reactor is coupled simultaneously (in "parallel") to the torch and to the injection apparatus for injecting the material to be treated.

This in-line configuration offers numerous advantages, in particular it is very simple to operate, it has a suction effect whereby the syngas is sucked in by the plasma jet, and it also offers entrainment of the syngas/plasma jet mixture along a straight line (propagation axis) thereby minimizing any interactions between the overheated mixture and the walls of the feed enclosure and of the reactor.

The intimate contact of the syngas and of the plasma jet also makes it possible to transfer energy directly between the plasma jet and the syngas, thereby making it possible not only to consume less energy but also to achieve syngas/plasma jet mixture temperatures that are higher than with prior art apparatus.

The fluid injected to increase the turbulence of said turbulent mixture can be, by way of example, a syngas to be treated or a fluid used to adjust the composition of said syngas.

In various particular implementations of this apparatus for treating a syngas, each having its own advantages and being susceptible of numerous technically feasible combinations:

- said distribution chamber has an annular shape surrounding said feed enclosure, said distribution chamber on the one hand being in fluid communication with said feed enclosure via said at least two openings and on the other hand receiving said syngas to be treated via at least one inlet port,
- the ratio between the section of said at least one inlet port and said distribution chamber is at least equal to 0.08,
- said feed enclosure is in fluid communication with said distribution chamber via at least two openings circumferentially distributed around the plasma jet in order to distribute said vortex flow in an homogeneous manner around said plasma jet,
- the opening sections of said feed enclosure being identical or different, said at least two openings are configured such that for each opening, the ratio of the velocity of said syngas to be treated to the velocity of said plasma jet is at least equal to 0.03,
- the ratio of the section of said feed enclosure to the section of said plasma jet inlet is at least equal to 240,
- the angle between the flared segment wall and the propagation axis of the plasma jet is comprised between 20° and 70° to enhance the turbulence of said turbulent mixture thus created,
- the main axis of each opening of the feed enclosure is inclined at an angle $\alpha$ with respect to the wall of said feed enclosure, said angle $\alpha$ determining the intensity of the vortex flow,
- the angle $\beta$ made between the main axis of each opening of the feed enclosure and said propagation axis is in the range between 45° and 135°,
- said feed enclosure, said flared segment and said elongate reactor are provided with injection orifices for injecting a protective fluid capable of circulating in a protective circuit placed within the thickness of said feed enclosure, said flared segment and said elongate reactor,
- the outlet port is connected to at least one setting means for setting the outlet gas.

For example, the setting means comprise at least one heat exchanger that makes it possible to quench the outlet gas.

The disclosed embodiments also provide a system for treating waste or biomass, which system comprises a first treatment stage for treating waste or biomass, which first stage receives said waste or said biomass and generates a syngas, and a second treatment stage coupled to said first stage for the purpose of receiving said syngas.

According to the disclosed embodiments, the second stage is constituted by apparatus for treating the syngas as described above.

This system makes it possible to produce an outlet gas that is a purified syngas containing a majority of the species H2 and CO. This syngas purified by non-transferred-arc plasma torch and having a higher calorific value than it had prior to treatment, has a value in use that predestines it advantageously for use in electricity generation, in producing biofuel, or in organic chemistry, e.g. for producing synthetic polymer.

The disclosed embodiments therefore also provide a system for generating electrical energy from waste or biomass, said system comprising at last one gas turbine or at least one gas engine. According to the disclosed embodiments, said system for generating electrical energy is equipped with a system for treating waste or biomass as described above. Said at least one gas turbine, or said at least one gas engine, is actuated by said outlet gas generated by said system for treating waste or biomass.

The disclosed embodiments also provide a system for producing a synthetic fuel or "synfuel" from waste or from biomass, said system comprising at least one catalytic reactor. According to the disclosed embodiments, said system is equipped with a system for treating waste or biomass as described above.

Preferably, since said catalytic reactor generates a residual gaseous product, said system further comprises a looping circuit connected firstly to said catalytic reactor for the purpose of recovering said residual gaseous product, and secondly to at least one of the elements chosen from the group comprising at least one injector, at least one injection orifice, said plasma torch, and a combination of these elements for the purpose of feeding said gaseous product into said treatment apparatus. Said looping circuit includes a compressor for compressing said residual gaseous product prior to it being fed into said apparatus.

This catalytic reactor is preferably a reactor making it possible for the "Fischer-Tropsch" reaction to take place, i.e. hydrocarbons to be produced by causing a mixture comprising at least carbon monoxide and hydrogen to react in the presence of a catalyst. This method is a well-known industrial method that is not described herein.

The catalysts used can be of various types and they generally comprise at least one metal chosen from the group comprising iron, cobalt, ruthenium, and vanadium.

The metal is typically dispersed over a medium that can comprise a porous mineral material such as an oxide chosen from the group comprising alumina, silica, titanium oxide, zirconium, rare earths, and combinations of these elements.

The catalyst can, in known manner, further comprise one or more activation agents chosen from at least one of the groups I to VII of the periodic table.

Merely by way of illustration, the catalytic reactor can be a reactor of the bubble column type.

Since the exhaust gas or the residual gaseous product from the catalysis is fed back in or recycled into the treatment apparatus via the looping circuit, an electricity generation system or a synfuel production system is thus obtained that emits a low level of pollution.

BRIEF DESCRIPTION OF THE DRAWINGS

The disclosed embodiments are described in more detail below with reference to the accompanying drawings, in which.

DETAILED DESCRIPTION

Figure 1:
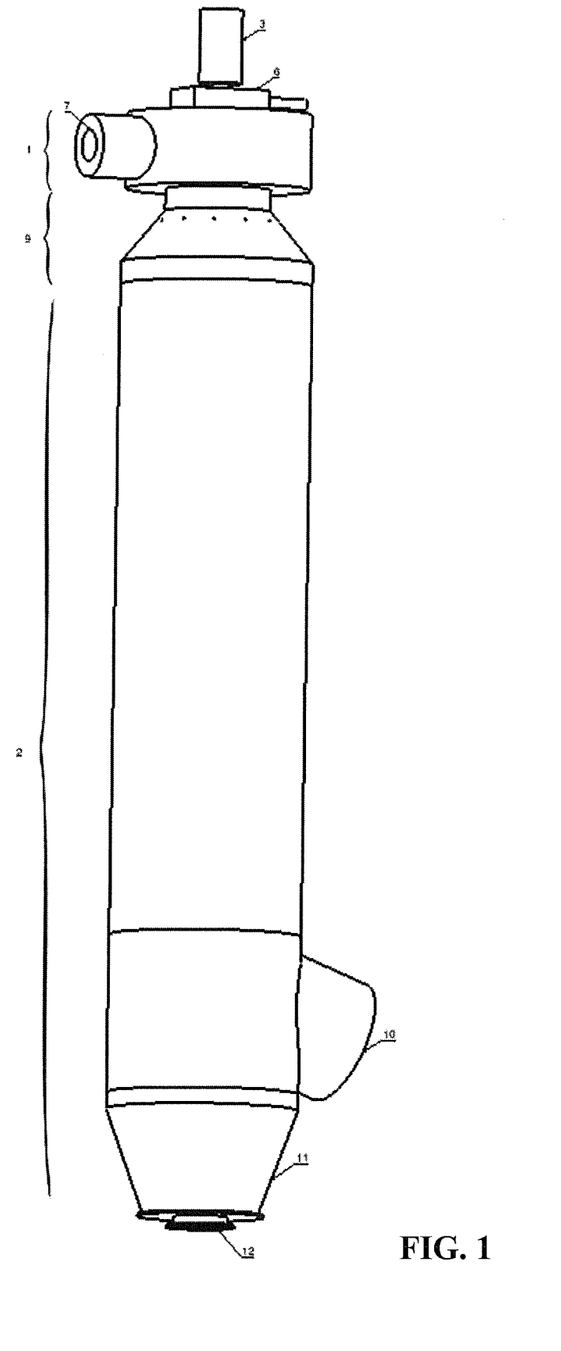
FIG. 1 is a perspective view of apparatus for treating a syngas in a particular embodiment of the disclosed embodiments.
Figure 2:
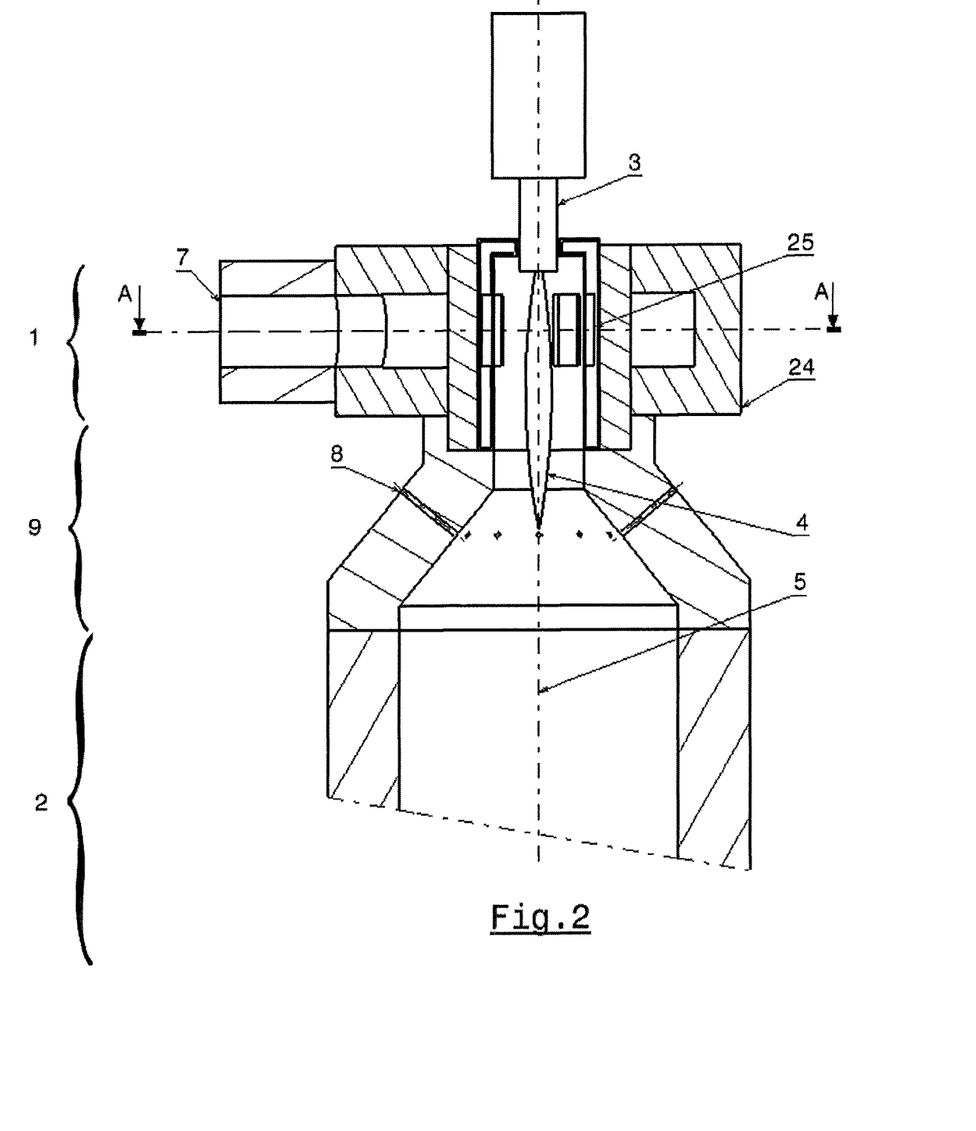
FIG. 2 is a fragmentary section view of the feed enclosure of the apparatus of FIG. 1.

FIGS. 1 and 2 show apparatus for treating a syngas in a preferred embodiment of the disclosed embodiments. This apparatus, which forms an in-line system, comprises a feed enclosure 1, a reactor 2 and a flared segment 9.

Said flared segment 9 is placed between the feed enclosure 1 and the reactor 2, connected to said feed enclosure 1 and reactor 2 and in fluid communication with said feed enclosure 1 and said reactor 2. The feed enclosure 1 and the reactor 2 are therefore in fluid communication through said flared segment 9.

The feed enclosure 1, the flared segment 9 and the reactor 2 each have an internal volume defined by walls, which walls are covered, on the inside, with refractory materials that withstand high temperatures, e.g. based on chromium/corundum. These refractory materials make it possible, in particular, to reduce heat losses.

The feed enclosure 1, the flared segment 9 and the reactor 2 which, in this example, are made of metal, are cooled by an external pressurized fluid circuit, the cooling fluid being, for example, soft water. They are thus provided with injection orifices for injecting said cooling, said cooling fluid circulating in a cooling circuit placed within the thickness of said feed enclosure 1, said flared segment 9 and said elongate reactor 2. However, the apparatus is designed not to have any cold spots that might constitute zones for condensation of the particles present in the syngas.

The feed enclosure 1 includes a non-transferred-arc or "blown arc" plasma torch 3. This torch 3 is designed to generate a plasma jet 4 having a propagation axis 5 that is collinear or substantially collinear with the main axis of the torch 3.

The use of such a torch 3 makes it possible not only to obtain a plasma jet that has a very high temperature, typically lying in the range 2000° C. to 5000° C. as a function of the plasma enthalpy defined by the operating point of the plasma torch 3, but also to provide full independence between the internal volume of the feed enclosure 1 and the plasma torch 3. The feed enclosure 1 therefore has a cooled isolation. Valve 6 authorizes the isolation of the torch 3 from the feed enclosure 1. It is then possible to work on the torch 3 without exposing the apparatus as a whole to air.

The apparatus advantageously includes automatic permutation means for permuting a first non-transferred-arc torch with a second non-transferred-arc torch in order to replace a torch that requires maintenance or in order to increase the power of the torch. Merely by way of illustration, these automatic permutation means can be actuated hydraulically.

The feed enclosure 1 is also provided with three openings 25 placed downstream from the plasma torch 3 for the purpose of feeding in the syngas to be treated in the vicinity of the plasma jet 4. These openings 25 are directed in a manner such as to feed in the syngas in a direction that is distinct from the propagation axis 5 of the plasma jet 4, so as to form a vortex flow that progresses towards said plasma jet 4 so as to establish a contact zone between said plasma jet 4 and at least part of said syngas. This contact zone enhances thermal transfer between said plasma jet 4 and said at least part of the syngas in order to heat the syngas and to promote tar and char particles removal. Advantageously, said syngas is received at one inlet port 7, said syngas propagating then through a distribution chamber 24 having an annular shape that surrounds said feed enclosure 1, said distribution chamber 24 being in communication with said feed enclosure 1 via said openings 25.

The said distribution chamber 24 modifies the direction and homogenizes the gas velocity of said syngas before being fed via said three openings 25 in said feed enclosure 1, in order to have the same flow rate through each of said openings 25. This is made possible if the ratio between the sections of the inlet port 7 and the internal section of the distribution chamber 24 is at least equal to 0.08. Thus, the gas momentum is reduced enough to make a uniform distribution through the three openings 25.

The sections of these openings 25, which can be different, are determined by the ratio between the velocity of the syngas to be treated across these openings 25 and the velocity of the plasma jet 4. In order to have an intimate contact, this ratio has to be at least equal to 0.03. If the velocity of the syngas is too low, intimate contact between said plasma jet 4 and at least part of said syngas is not possible, the syngas to be treated is thrown up the wall of the feed enclosure 1. This data is valid if the section of the feed enclosure 1 is not too high. The ratio between the section of this feed enclosure 1 and the section of the plasma jet inlet has to be at the most equal to 240.

Thus, the syngas to be treated, shared out the openings 25, is transferred downstream from the plasma torch 3 in a distinct direction from the propagation axis 5 of the plasma jet 4. The lines and the direction of these openings 25 are chosen in the way to have a vortex flow of said syngas that progresses towards said plasma jet 4 along a helical path in order to increase the residence time in the elongate reactor 2.

More generally, the angle formed between the main axis of said openings 25 and the propagation axis 5 of the plasma jet 4 results from computations and experimentations taking into account parameters of the plasma jet 4 generated by the non-transferred-arc torch 3 and of the flows to be treated (syngas and components for adjusting the composition of said syngas). Merely by way of illustration, this angle can lie approximately in the range 90° to 135°.

The openings 25 can be orthogonal to the feed enclosure wall or inclined in order to intensify the vortex effect created by the syngas around the plasma jet 4.

These openings 25 can be fairly shared out or not in order to balance the plasma jet 4 around its propagation axis 5.

The propagation axis 5 of the plasma jet is directed so as to direct the syngas/plasma jet mixture towards the elongate reactor 2 in which the syngas hosts reactions leading to it being transformed into the outlet gas.

Downstream from the feed enclosure 1, a flared segment 9 being flared in the same direction as the direction in which the plasma jet 4 propagates along its propagation axis 5, blow up the said assembly, made by said plasma jet and said syngas, thus creating a turbulent fluid zone and so, favoring the turbulent mixing between the syngas to be treated and the plasma jet 4. In that way, energy contained by the plasma jet is restituted to the syngas. In this example, this flared segment 9 is a nozzle of the blast pipe type.

Calculations have been made in order to define a range of values in which turbulence effect is optimum. In that way, the angle between the flared segment 9 and the propagation axis 5 is in the range of 20° to 70°.

Injectors 8 are placed on the flared segment 9 for injecting one or more fluids with a view to accentuate the turbulence of the turbulent mixture in the flared segment 9. Thus the heat transfer from the plasma jet 4 to the syngas in this turbulent mixture is optimized.

Figure 4:
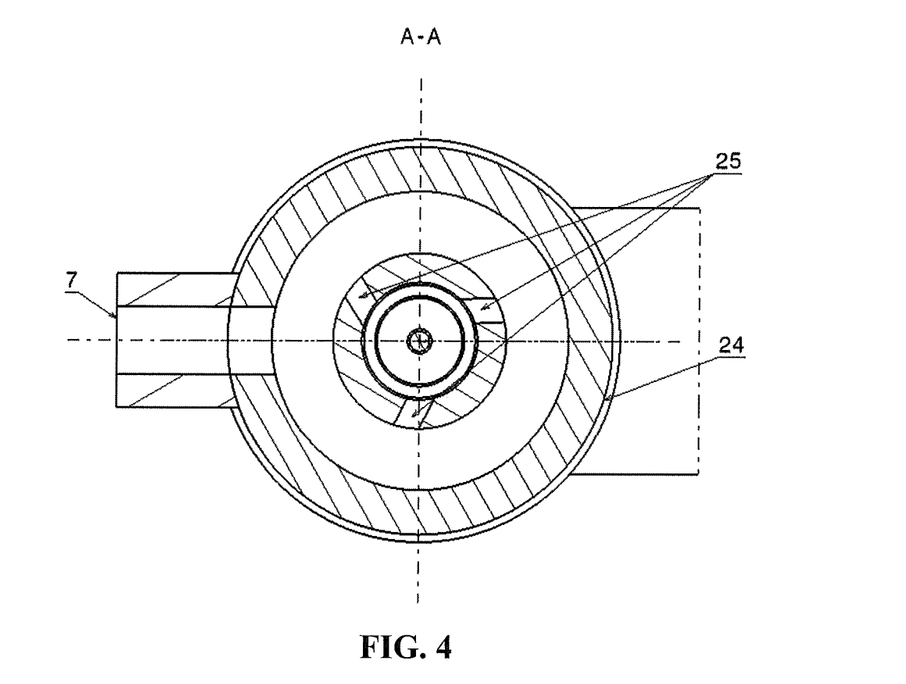
FIG. 4 is a fragmentary section view of the introduction chamber of the apparatus of FIG. 1.
Figure 5:
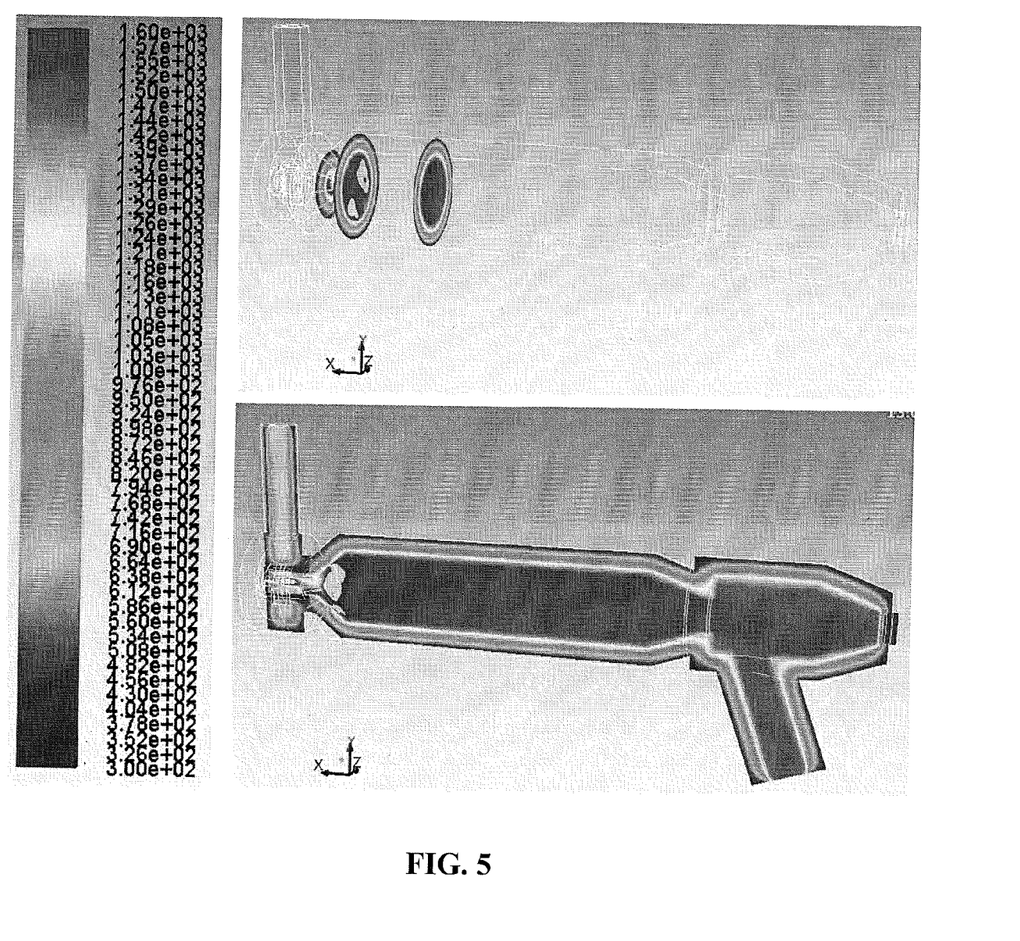
FIG. 5 is a view of temperature radial and longitudinal profiles in the elongate reactor.

The advantages of the disclosed embodiments are illustrated by FIG. 5. In this configuration, the syngas is fed around the plasma jet 4 via three openings 25 oriented such as to form a vortex flow that progresses towards the plasma jet 4, as shown in the FIG. 4. The assembly made by said syngas and said plasma jet 4 in the contact zone propagates in the feed enclosure 1, optimizing heat transfer, until the flared segment 9. There, the said assembly is blown up creating a turbulence zone which is characterized by very high temperatures. These high temperatures are represented by a red color area.

In addition, as a function of the initial distribution of the main components (C, H, O) in the organic materials present in the waste or biomass leading to the syngas to be treated, it is possible that the removal of tar, of water, and of carbon dioxide by treating the syngas in the apparatus of the present invention might not generate sufficient carbon monoxide (CO) or hydrogen in the outlet gas for significant use in energy generation. So injectors 8 can also be used to adjust the composition of the syngas to be treated. For example, the injectors can be injection nozzles for injecting a gas such as $CO_2$, or nebulizers when a liquid, such as water, is injected. A combination of these elements can also be implemented.

Said injectors 8 are preferably placed in a manner such as to feed in the materials substantially in the direction of the flow of the syngas/plasma jet mixture.

These fluids are intrinsically available on site, because they are, advantageously recycled from the downstream stages of the treatment method of the disclosed embodiments.

The reactor 2 has a substantially cylindrical elongate shape and, in its downstream portion, is provided with an outlet port 10 for the outlet gas. The said outlet port 10 is placed on the radial part of the reactor.

At least part of the inorganic part of the syngas thus treated is extracted via a second outlet whose main axis is collinear or substantially collinear with the longitudinal axis of said reactor.

The cylindrical geometrical shape of the reactor 2 is designed so as advantageously to limit the speed of the syngas/plasma jet mixture at the wall of the reactor 2 and to increase the residence time, The longitudinal axis of said reactor 2 is substantially collinear with the propagation axis 5 of the plasma jet so as to limit the contact between the plasma jet and the walls of the reactor 2.

Said reactor 2 constitutes a thermal or thermochemical transformation zone for thermally or thermochemically transforming the syngas to be treated with a view to it being converted into outlet gas. This zone results from the intimate mixing of the syngas to be treated and of the plasma jet that takes place in the feed enclosure 1. The length of said reactor 2, or furnace, is determined in order to optimize the residence time of the materials to be synthesized or to be treated, which residence time is necessary for accomplishing the thermochemical reactions. This residence time is in the range of 2 seconds to 5 seconds.

The reactor 2 can also be provided with injection orifices for injecting a protective fluid, which orifices are connected to a circuit for injecting said fluid.

The apparatus is provided with at least one sensor (not shown) for measuring the temperature of the outlet gas in a manner such as to adjust the quality of the outlet gas by adjusting the power of the plasma jet 4 coming from the plasma torch 3. The adjustment of the operating parameters of the plasma torch 3 is technically feasible in a time shorter than one second. The sensor can be an optical pyrometer or a temperature probe mounted on the wall of the duct.

Figure 3:
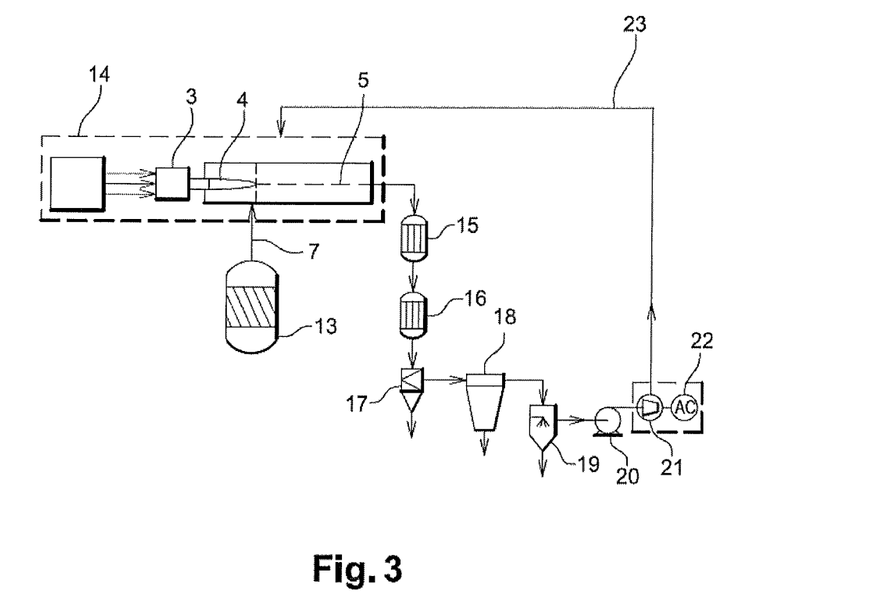
FIG. 3 is a diagram showing a system for generating electrical energy from waste or biomass, which system incorporates the treatment apparatus of FIG. 1.

The feed enclosure 1 and the reactor 2 can have coupling pieces respectively at the inlet port 7 and at the outlet port 10 making it possible to mount said apparatus onto a more complex system such as a system for treating waste or biomass, or for generating electrical energy from waste or from biomass (FIG. 3). These coupling pieces have shapes chosen from the group comprising a rectangular shape and a cylindrical shape.

A way of using the outlet gas from the syngas treatment method of the disclosed embodiments is described below.

FIG. 3 is a diagram showing a system for generating electricity from waste or from biomass in a particular embodiment of the disclosed embodiments.

This system includes a first stage 13 for treating waste or biomass. The first stage receives waste or biomass at its inlet and generates syngas at its outlet. This stage can, in a known manner, be an autothermal gasification reactor or a single-stage gasification reactor using thermal plasma. The syngas is sent to treatment apparatus 14 for treating the syngas as described above, which apparatus makes it possible to produce an outlet gas. At the outlet of the apparatus, the gas has a temperature lying in the range 1150° C. to 1300° C.

The outlet gas is sent to a first heat exchanger 15 for the purpose of setting the gas and of cooling it to a temperature lying in the range 400° C. to 600° C. The outlet gas treated in this way is then sent to a second heat exchanger 16, at the outlet of which its temperature is in the vicinity of in the range 100° C. to 200° C.

The outlet gas then enters a dust collection unit 17 making it possible to collect the particles before the gas is sent into a bag filter 18. Finally a gas scrubber 19 that makes it possible to solubilize a gaseous pollutant in a liquid is implemented for removing, in particular, any traces of sulfur dioxide or of chlorine. A compressor 20 makes it possible to put the outlet gas treated in this way under extra pressure on a gas turbine 21. The outlet gas actuates the gas turbine 21 which is connected to an alternator 22 which transforms the mechanical energy into electrical energy.

The gas turbine 21 can be replaced merely by a gas engine if the flow rate of the outlet gas is not sufficiently high. Preferably, since the gas turbine (or the gas engine) generates an exhaust gas, the system includes a looping circuit 23 connected firstly to said gas turbine (or to said gas engine) for the purpose of recovering the exhaust gas, and secondly to at least one of the elements chosen from the group comprising at least one injector, at least one injection orifice, the plasma torch, and a combination of these elements, for the purpose of feeding the exhaust gas into the treatment apparatus 14. The looping circuit 23 also includes a compressor (not shown) for compressing the exhaust gas before it is fed into the apparatus. The exhaust gas is typically carbon dioxide.

What is claimed is:

1. Apparatus for processing a syngas, said apparatus comprising:
    a feed enclosure to which a flared segment is connected, said feed enclosure and said flare segment being in communication of fluid,
    said flared segment being further connected to an elongate reactor, said feed enclosure, said flared segment and said elongate reactor each having an internal volume defined by walls covered at least partially with refractory elements, said feed enclosure and said elongate reactor being in fluid communication through said flared segment;
    said feed enclosure including a non-transferred-arc plasma torch having a main axis, said non-transferred-arc plasma torch serving to generate a plasma jet having a propagation axis that is collinear or substantially collinear with the main axis of said non-transferred-arc plasma torch;
    said feed enclosure being provided with at least two openings placed downstream from said non-transferred-arc plasma torch, said at least two openings being configured to feed in a syngas in a manner such that said syngas forms a vortex flow that progresses towards said plasma jet so as to establish a contact zone between said plasma jet and at least part of said syngas;
    said at least two openings of said feed enclosure being in fluid communication with a distribution chamber surrounding at least partially said feed enclosure, said distribution chamber being provided with at least one inlet port receiving the syngas to be treated;
    said flared segment flaring in the same direction as said propagation axis extends to create a turbulent mixture from the assembly formed by said plasma jet and said at least part of the syngas by blowing it up;
    said flared segment having at least one injector serving to feed in at least one fluid to enhance the turbulence of said turbulent mixture,
    said elongate reactor having a substantially cylindrical elongate shape, the longitudinal axis of said elongate reactor being collinear or substantially collinear with the propagation axis of said plasma jet, and
    said elongate reactor having at least an outlet port for extracting said outlet gas.

2. Apparatus according to claim 1, wherein said distribution chamber has an annular shape surrounding said feed enclosure, said distribution chamber being in fluid communication with said feed enclosure via said at least two openings and receiving said syngas to be treated via at least one inlet port.

3. Apparatus according to claim 2, wherein the ratio between the section of said at least one inlet port and said distribution chamber is at least equal to 0.08.

4. Apparatus according to claim 1, wherein said feed enclosure is in fluid communication with said distribution chamber via at least two openings circumferentially distributed around the plasma jet in order to distribute said vortex flow in an homogeneous manner around said plasma jet.

5. Apparatus according to claim 1, wherein the opening sections of said feed enclosure being identical or different, said at least two openings are configured such that for each opening, the ratio of the velocity of said syngas to be treated to the velocity of said plasma jet is at least equal to 0.03.

6. Apparatus according to claim 1, wherein the ratio of the section of said feed enclosure to the section of said plasma jet inlet is at least equal to 240.

7. Apparatus according to claim 1, wherein the angle between the flared segment wall and the propagation axis of the plasma jet is comprised between 20° and 70° to enhance the turbulence of said turbulent mixture thus created.

8. Apparatus according to claim 1, wherein the main axis of each opening of the feed enclosure is inclined at an angle $\alpha$ with respect to the wall of said feed enclosure, said angle $\alpha$ determining the intensity of the vortex flow.

9. Apparatus according to claim 1, wherein the angle $\beta$ made between the main axis of each opening of the feed enclosure and said propagation axis is in the range between 45° and 135°.

10. Apparatus according to claim 1, wherein said feed enclosure, said flared segment and said elongate reactor are provided with injection orifices for injecting a protective fluid capable of circulating in a protective circuit placed within the thickness of said feed enclosure, said flared segment and said elongate reactor.

11. A system for treating waste or biomass, which system comprises a first treatment stage for treating waste or biomass, which first stage receives said waste or said biomass and generates a syngas, and a second treatment stage coupled to said first stage for the purpose of receiving said syngas, said system being wherein said second stage is constituted by apparatus for treating said syngas according to claim 1.

12. A system for generating electrical energy from waste or biomass, said system comprising at last one gas turbine or at least one gas engine, said system for generating electrical energy being wherein it is equipped with a system for treating waste or biomass according to claim 11, and in that said at least one gas turbine, or said at least one gas engine, is actuated by said outlet gas generated by said system for treating waste or biomass.

13. A system for generating electrical energy according to claim 12, wherein, since said at least one gas turbine or said at least one gas engine generates an exhaust gas, said system further comprises a looping circuit connected firstly to said at least one gas turbine or to said at least one gas engine for the purpose of recovering said exhaust gas, and secondly to at least one of the elements chosen from the group comprising at least one injector, at least one injection orifice, said plasma torch, and a combination of these elements for the purpose of feeding said exhaust gas into said treatment apparatus, said looping circuit including a compressor for compressing said exhaust gas prior to it being fed into said apparatus.

14. A system for producing a synthetic fuel or "synfuel" from waste or from biomass, said system comprising at least one catalytic reactor, said system equipped with a system for treating waste or biomass according to claim 11.

15. A system for producing a synthetic polymer from waste or from biomass, said system comprising at least one catalytic reactor, said system equipped with a system for treating waste or biomass according to claim 11.

* * * * *